(12) United States Patent
Hulten et al.

(10) Patent No.: US 7,870,609 B2
(45) Date of Patent: Jan. 11, 2011

(54) DETECTION AND REMOVAL OF UNDESIRABLE ITEMS IN A DATA PROCESSING ENVIRONMENT

(75) Inventors: Geoffrey J. Hulten, Lynnwood, WA (US); John L. Scarrow, Sammamish, WA (US); Eliot C. Gillum, Mountain View, CA (US); Kumar S. Srivastava, Redmond, VA (US); Anatoliy Panasyuk, Bellevue, WA (US); Ivan Osipkov, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 865 days.

(21) Appl. No.: 11/772,099

(22) Filed: Jun. 29, 2007

(65) Prior Publication Data

US 2009/0006575 A1    Jan. 1, 2009

(51) Int. Cl.
*G06F 11/00* (2006.01)
*G06F 12/14* (2006.01)
(52) U.S. Cl. .......................................... 726/22; 726/25
(58) Field of Classification Search .................. 726/22, 726/25
See application file for complete search history.

(56) References Cited

U.S. PATENT DOCUMENTS

| | | | |
|---|---|---|---|
| 6,704,874 B1 * | 3/2004 | Porras et al. | 726/22 |
| 7,139,798 B2 | 11/2006 | Zircher et al. | |
| 7,680,891 B1 * | 3/2010 | Pongsajapan | 709/206 |
| 2003/0191966 A1 * | 10/2003 | Gleichauf | 713/201 |
| 2004/0205772 A1 | 10/2004 | Uszok et al. | |
| 2004/0242321 A1 | 12/2004 | Overton | |
| 2005/0050151 A1 | 3/2005 | Mitchell et al. | |
| 2005/0050222 A1 | 3/2005 | Packer | |
| 2005/0144067 A1 | 6/2005 | Farahat et al. | |
| 2006/0069697 A1 | 3/2006 | Shraim et al. | |
| 2006/0101021 A1 | 5/2006 | Davis et al. | |
| 2006/0168048 A1 | 7/2006 | Lyle et al. | |
| 2006/0253458 A1 * | 11/2006 | Dixon et al. | 707/10 |
| 2007/0044152 A1 | 2/2007 | Newman et al. | |

OTHER PUBLICATIONS

Casado, et al., Flow-Cookies: A Bandwidth Amplication Approach to Defend Against DDoS Flooding Attacks, available at least as early as Apr. 4, 2007, at <<http://www.stanford.edu/~casado/flow_cookies.pdf>>, pp. 1-12.

Chen, et al., "Identifying MMORPG Bots: A Traffic Analysis Approach", available at least as early as Apr. 4, 2007, at <<http://delivery.acm.org/10.1145/1180000/1178829/a4-chen.pdf?key1=1178829&key2=2141665711&coll=GUIDE&dl=GUIDE&CFID=19057790&CFTOKEN=87499215>>, ACM, 2006, pp. 1-9.

(Continued)

*Primary Examiner*—Kambiz Zand
*Assistant Examiner*—William S Powers
(74) *Attorney, Agent, or Firm*—Lee & Hayes, PLLC (57) ABSTRACT

Functionality is described for addressing a threat to the security of a user device that utilizes a network-accessible service. The functionality operates by assessing the likelihood that the user device is infected by the undesirable item. When the user device makes a request to access the network-accessible service, the functionality can interact with the user device in a manner that is governed by the assessed likelihood that the user device is infected by the undesirable item.

19 Claims, 8 Drawing Sheets

OTHER PUBLICATIONS

Dreger, et al., "Dynamic Application-Layer Protocol Analysis for Network Intrusion Detection", available at least as early as Apr. 4, 2007, at <<http://www8.in.tum.de/~anja/feldmann/papers/usenix06.pdf>>, pp. 1-16.

Ramachandran, et al., "Revealing Botnet Membership Using DNSBL Counter-Intelligence", available at least as early as Apr. 4, 2007, at <<http://www-static.cc.gatech.edu/~feamster/publications/dnsbl.pdf>>, pp. 1-6.

* cited by examiner

DETECTION AND REMOVAL OF UNDESIRABLE ITEMS IN A DATA PROCESSING ENVIRONMENT

BACKGROUND

Figure 1:
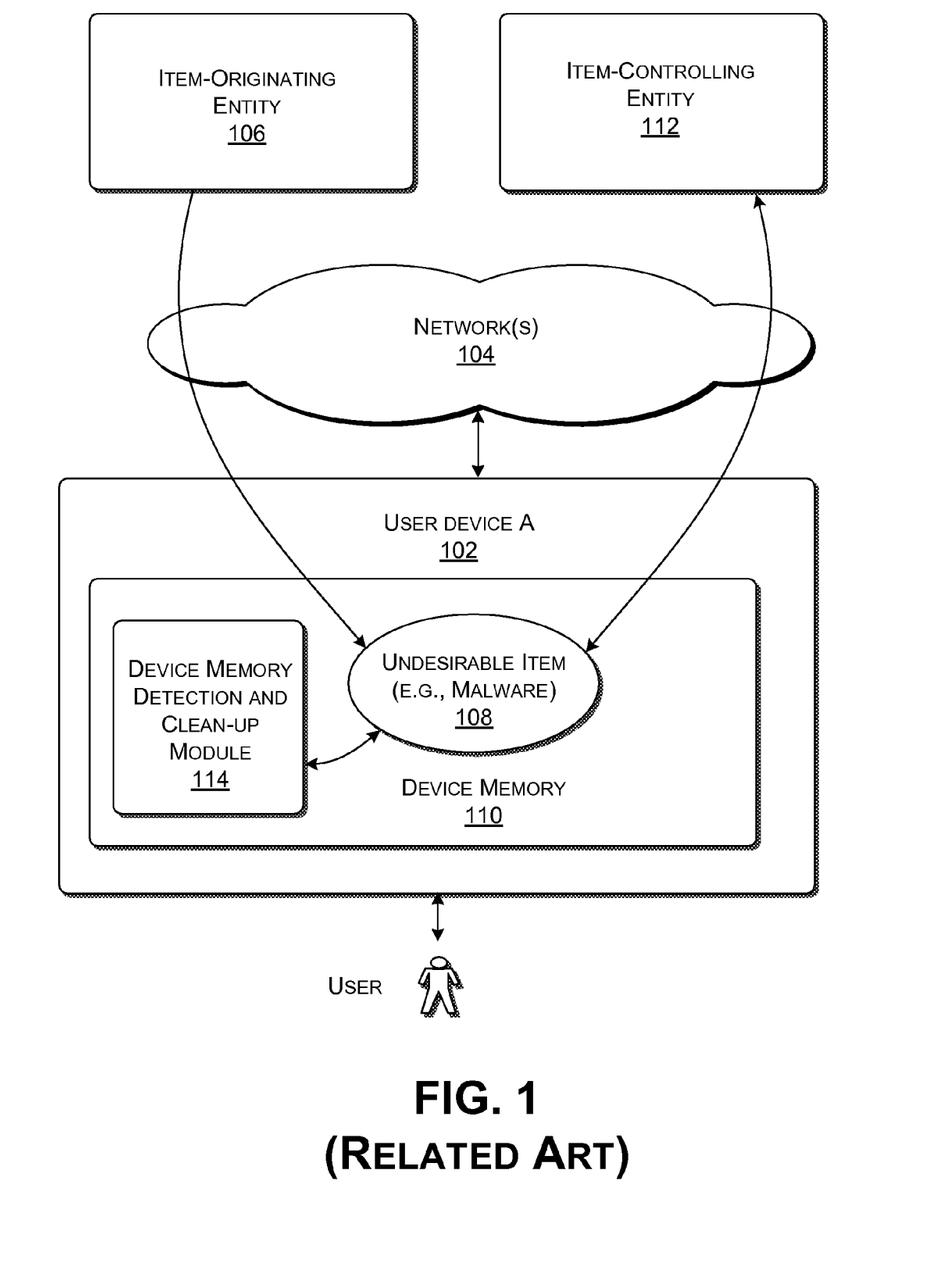
FIG. 1 shows a known approach to detecting and removing an undesirable item that has infected a user device.

Society has become increasingly reliant on network-accessible services. Attacks on such services are therefore regarded as significant threats. FIG. 1 illustrates one such mode of attack. In this example, a user device 102 interacts with one or more services (not shown) via a wide area network 104, such as the Internet. In the course of this interaction, a malicious entity (referred to as an item-originating entity 106) may "infect" the user device 102 with any type of undesirable item 108, e.g., by causing the undesirable item 108 to be stored in memory 110 of the user device 102. The undesirable item 108 can represent any type of content that is provided to the user device 102 without the permission of a user associated with the user device 102. In one case, the undesirable item 108 can represent instruction-bearing content, also known in the art as malware, a robot (or more simply, a bot).

Subsequent to infecting the user device 102 with the undesirable item 108, an item-controlling entity 112 can invoke the undesirable item 108 to perform various actions. The item-controlling entity 112 can represent the item-originating entity or another malicious entity. In one case, for instance, the item controlling entity 112 can invoke the undesirable item 108 to cause damage to any part of the user device 102. In another case, the item controlling entity 112 can invoke the undesirable item 108 to retrieve sensitive data maintained by the user device 102. For example, the item-originating entity 112 can access account information maintained by the user device 102 and attempt to use that information to steal funds from a user. In other cases, the item-controlling entity 112 can access data which reveals the websites visited by a user; the item controlling entity 112 can use this information to then mount a "phishing" type of attack on a user, e.g., by impersonating the websites that the user is known to visit and then stealing sensitive data from the user. The item-controlling entity 112 can invoke the undesirable item 108 to achieve other objectives that are undesirable from the standpoint of a user associated with the user device 102.

Various mechanisms have been proposed to help counter to the above-described type of threat. In one approach, a device detection and clean-up module 114 (more simply, a "clean-up module" 114) can be used by the user device 102 to scan the memory 110 of the user device 102 to determine whether it includes the undesirable item 108 (e.g., by reference to a known signature associated with this item 108). Once detected, the clean-up module 114 can also help remove the undesirable item 108. A potential shortcoming of this approach is that the undesirable item 108 can be specifically designed to circumvent the safeguards provided by the clean-up module 114, thus preventing it from detecting and removing the undesirable item.

SUMMARY

Functionality is described for addressing a threat to the security of a user device that utilizes a network-accessible service. The functionality operates by assessing the likelihood that the user device is infected by the undesirable item. When the user device makes a request to access the network-accessible service, the functionality can interact with the user device in a manner that is governed by the assessed likelihood that the user device is infected by the undesirable item.

More specifically, in one illustrative implementation, the functionality can provide different kinds of interaction for different respective levels of certainty that the user device is infected. For instance, for a first level of likelihood, the functionality can grant the user device unrestricted access to the network-accessible service. For a second level of likelihood, the functionality can grant the user device restricted access to the network-accessible service. For a third level of likelihood, the functionality can grant the user device access to the network-accessible service in response to the user performing a security-related procedure. For a fourth level of likelihood, the functionality can prevent the user device from accessing the entire network-accessible service.

The functionality can assess the likelihood that the user device is infected using one or more approaches. According to one illustrative approach, the functionality can assess the likelihood by detecting a potential presence of the undesirable item within a particular time frame (e.g., by detecting a pattern of activity that is indicative of a "spam"—type attack, and so forth). In that time frame, the undesirable item may be associated with an identified network address. The functionality can then determine whether the user device utilized the identified network address within the particular time frame. If so, there is some likelihood that the user device is infected with the undesirable item.

In one illustrative implementation, the user device interacts with the network-accessible service via an intermediary appliance module. The intermediary appliance module, in cooperation with an item management module, plays a role in assessing the likelihood that the user device is infected by the undesirable item. The intermediary appliance module also can play a role in interacting with the user device following the assessment.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth illustrative functionality for detecting and removing undesirable items in a data processing environment. The functionality can be manifested in various systems, apparatuses, modules, procedures, storage mediums, data structures, and other forms.

The term "undesirable item" can represent any type of content that is provided to a user device without the permission of a user associated with the user device. In one illustrative case, the undesirable item can represents "instruction-bearing content," also known in the art as malware, a robot (or more simply, a bot). The instruction-bearing content provides executable instructions (program code, script, etc.) that can be invoked by an entity to cause an operation that is undesirable from the standpoint of the user.

This disclosure includes the following sections. Section A describes an illustrative system for detecting and removing an undesirable item. Section B describes illustrative procedures that explain the operation of the system of Section A.

As a preliminary note, any of the functions described with reference to the figures can be implemented using software, firmware, hardware (e.g., fixed logic circuitry), manual processing, or a combination of these implementations, and so on. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Certain figures describe the approach in flow chart form. In this manner of explanation, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

A. Illustrative System

A. 1. Overview of System

Figure 2:
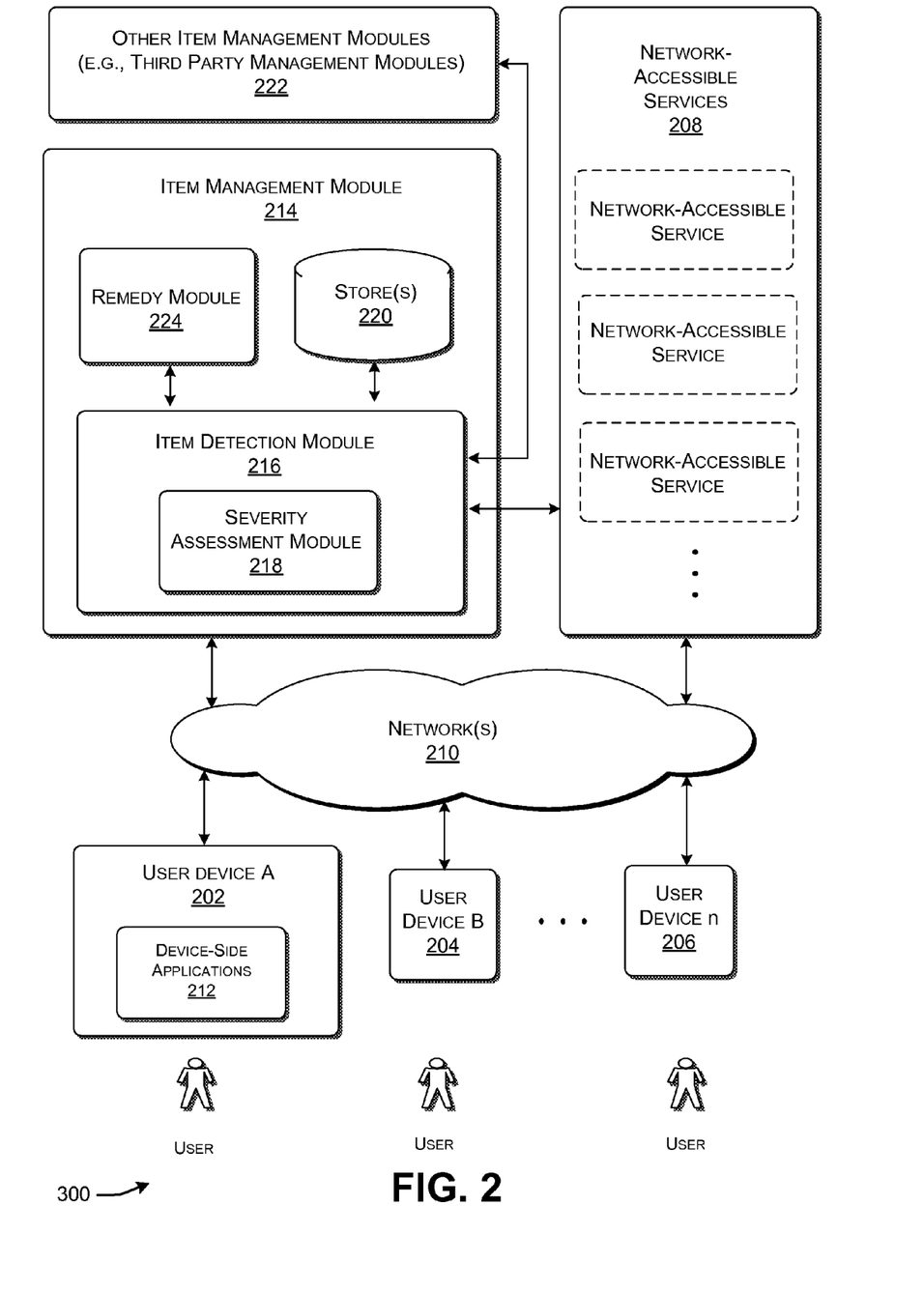
FIG. 2 shows a system that includes an item management module for detecting and removing an undesirable item.

FIG. 2 shows a data processing environment 200 including functionality for detecting and removing undesirable items. The environment 200 includes a plurality of user devices (202, 204, . . . 206). The user devices (202, 204, . . . 206) interact with one or more network-accessible services 208 via one or more networks 210.

The user devices (202, 204, . . . 206) can include any type of data processing devices, such as personal computers, lap top computers, personal digital assistant (PDA) devices, mobile telephone devices, game console devices, set-top box devices, and so forth. Each user device can include various applications. For example, FIG. 2 shows that user device A 202 includes one or more device-side applications 212.

The network-accessible services 208 include functionality for performing any operations. For example, a network-accessible service can correspond to an Email-related service, an Instant Messenger (IM) service, a calendar-related service, a search-related service, and so on. In one case, a single entity administers all of the network-accessible services 208. In another case, two or more entities administer the network-accessible services 208.

The network(s) 210 can represent a local area network (LAN), a wide area network (WAN) (e.g., the Internet), or some combination of LAN(s) and WAN(s). The network(s) 210 can be implemented by any combination of wireless links, hardwired links, routers, gateways, name servers, and so forth, and can be governed by any protocol or combination of protocols.

In one case, a device may interact with the networks 210 using a unique network address. In another case, plural devices may interact with the networks 210 using a single network address. For instance, plural devices in a home may interact with the networks 210 using a router mechanism having a single network address associated therewith. In another case, a device may interact with the networks 210 using plural network addresses. For example, the device may interact with the networks 210 via a provider entity, and that provider entity can connect the user device to the networks 210 using a network address that changes over time. Still other connection strategies and combinations of connection strategies can be used.

A user who operates a user device may represent himself or herself to one or more network-accessible service 208 using any type of user identification information ("user ID") (or any collection of user IDs). The user ID is also referred to as application-level identification information (as opposed to a network-level address, e.g., an IP address). In one case, a single user may exclusively use a single user device. In another case, two or more users may regularly use a single user device (such as in the common case of the members of a family which regularly use a single personal computer within the home).

Any of the user devices (202, 204, . . . 206) can store an undesirable item and thus become "infected" with the undesirable item. A malicious entity can cause a user device to become infected through various mechanisms. In one case, the malicious entity can exploit a security weakness in one or more applications 212 provided by the user device. In another case, the malicious entity can disseminate the undesirable item to the user via a social network. For example, the malicious entity can provide the undesirable item to the user as an attachment to an Email or as a file shared among IM users, and so forth. The malicious entity can infect the user device using many other mechanisms. As explained above, once stored on the user device, the undesirable item can be controlled to perform various actions that may be contrary to the interests of the user.

To counter the threat of the undesirable item, the environment 200 can include an item management module 214. By way of overview, the purpose of the item management module 214 is to detect the potential infection of a user device by an undesirable item. The item management module 214 can further assess a level of certainty that the user device has become infected. The item management module 214 can then control the user device's interaction with the network-accessible services 208 in a manner that is based on the assessed level of certainty that the user device has become infected.

In one case, the item management module 214 is associated with the network-accessible services 208. For example, the item management module 214 and the network-accessible services 208 can be administered by the same entity. In another case, the item management module 214 and the network-accessible services can be administered by two respective entities; in this case, the item management module 214 and the network-accessible services 208 can act as partners.

In general, the item management module 214 serves as the locus for indirectly detecting the potential presence of an undesirable item and then for selectively controlling access to the network-accessible services 208. This approach is in contrast to a direct inspection of the memory of a user device for the presence of an undesirable item. By virtue of this feature, in some cases, the environment 200 shown in FIG. 2 can more reliably detect and remove undesirable items from a user device. This is because the item management module 214 is less vulnerable to attempts by a malicious entity to evade detection and removal of the undesirable item. In one illustrative case, for instance, the item management module 214 detects a potential infection by holistically examining general behavior in the data processing environment as a malicious entity attempts to monetize an undesirable item stored on one or more user devices. Since the malicious entity relies on this type of activity to profit from the undesirable item, it may be difficult for the malicious entity to conceal this behavior. Further, the item management module 214 can restrict access to the services 208 when it detects the possible presence of an undesirable item. An undesirable item cannot easily circumvent this type of preventative function, as the item management module 214 is acting as an independent gatekeeper within its own secure environment. In another implementation, the security provisions illustrated in FIG. 2 can be combined with other security mechanisms that operate by directly inspecting the memory of the user device for the presence of undesirable items.

To perform the above-described operations, the item management module 214 includes a number of components. A first component is an item detection module 216. The item detection module 216 detects the likelihood that a user device has become infected with an undesirable item. In connection therewith, the item detection module 216 can include a severity assessment module 218 which quantifies the likelihood that the user device has become infected, e.g., into one of a plurality of levels. In making its determination, the item detection module 216 can rely on one or more stores 220 (referred to in the singular below for ease of reference). The store 220 maintains information regarding activity that occurs within the data processing environment 200, including traffic flowing between various user devices and network-accessible entities. The store 220 can specifically maintain information which describes the user devices' interaction with the network-accessible services 208.

The item detection module 216 can use one or more tools in making its assessments. In one case, the item detection module 216 can examine the way that user devices are interacting with various network-accessible entities, such as the network-accessible services 208. The item detection module 216 can compare this activity information with patterns that are associated with suspicious behavior. To name one example, the item detection module 216 may note that several user devices have commenced, in general unison, sending a large number of Email messages. The item detection module 216 can flag this behavior as potentially indicative of an Email spam campaign. This Email spam campaign may be orchestrated by a malicious entity via undesirable items stored on the user devices. In another case, the item detection module 216 can determine that a user device is rapidly making click selections when interacting with a network-accessible service. The item detection module 216 can flag this behavior as potentially indicative of a click fraud campaign. In another case, the item detection module 216 can determine that a user device is making a large number of requests to ports that have well known exploits associated with them. The item detection module 216 can flag this behavior as potentially indicative of a port scanning type of attack. The item detection module 216 can inspect the activity information with respective to yet other types of suspicious behavior, represented by telltale signatures. The next subsection (Section A.2) sets forth details of another tool that the item management module 214 can use to detect the potential presence of an undesirable item stored on one or more user devices.

In one case, the item management module 214 performs all of the above-described detection functions using the item management module 214. In another case, the item management module 214 can rely, in whole or in part, on separate functionality to detect the presence of undesirable items in the data processing environment 200. For example, the item detection module 216 can supplement its analysis by relying on the detection functions performed by one or more other item management modules 222. For example, in the case in which the item management module 214 and the network-accessible services 208 are implemented by a single entity, the other item management modules 222 can be implemented by one or more third part entities. The other item management modules 222 can forward information regarding suspected activity to the item detection module 216.

Finally, the item management module 214 can include a remedy module 224 for responding to the suspicious activity detected by the item detection module 216. In one case, the remedy module 224 performs a notification function by notifying a user of a user device that the device may be infected by an undesirable item. Alternatively, or in addition, the remedy module 224 performs a preventative function by preventing the undesirable item from causing harm (or further harm) in the data processing environment 200. The remedy module 224 may also perform a corrective function by assisting the user device in resolving the assessed threat to its security. As will be discussed in greater detail below, the remedy module 224 can apply different approaches in responding to a potential threat to the security of a user device. The different approaches are applied for different assessed levels of confidence that the user device has been infected by an undesirable item.

In one case, the item detection module 216 can detect suspicious activity in the context of a user device's interaction with a particular type of service, such as an Email service. The remedy module 224 can apply its notification and/or remediation role in the context of the user's interaction with this same service as well as other services (such as an Instant Messaging service, etc.).

In one case, as shown in FIG. 1, the remedy module 224 is associated with the item management module 214. For example, the remedy module 224 and the item management module 214 can be administered by the same entity. In another case, the remedy module 224 and the item management module 214 can be administered by two respective entities; in this case, the remedy module 224 and the item management module 214 can act as partners. In the case in which the remedy module 224 is an independent entity, this module can address a security threat (in one case) by preventing a user device from accessing any network-accessible resources, including the network-accessible services 208 and the item management module 214 itself.

A.2. Illustrative Technique for Determining whether a User Device is Infected by an Undesirable Item.

Figure 3:
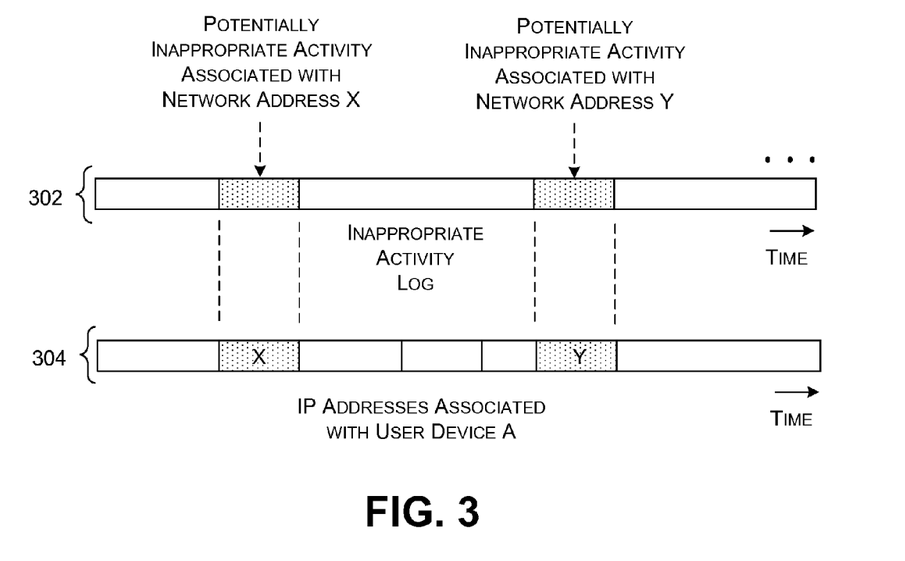
FIG. 3 shows activity logged by the item management module of FIG. 2, which enables the item management module to assess the likelihood that a user device is infected with an undesirable item.

FIG. 3 is a diagram which graphically illustrates the manner of operation of one tool that the item detection module 216 may use in detecting suspicious behavior. As shown, the item detection module 216 can identify a first collection of information 302 that represents suspicious behavior by one or more user devices. The item detection module 216 can use any one or more of the above-described techniques to identify this suspicious behavior. The first collection of information 302 itself can comprise a series of network addresses (e.g., IP addresses) associated with the suspicious behavior. The first collection of information 302 can also identify the time frames associated with the suspicious behavior.

In one case, as explained above, each user device may interact with the networks 210 using respective network addresses. In this case, the addresses in the first collection of information 302 may correspond to the network addresses assigned to the user devices which are perpetrating or otherwise associated with the suspicious behavior. In other cases, there may not be a static one-to-one correspondence between network addresses and user devices that are assigned to these network addresses. For example, as explained above, the data processing environment 200 may change the network addresses that are assigned to the user devices over time, such that a particular network address does not statically identify a user device. To address these scenarios, the item detection module 216 can provide a second collection of information 304. For each user device, the second collection of information 304 identifies a series of network addresses (e.g., IP addresses) assigned to the user device over a span of time.

The item detection module 216 can determine whether a particular user device is associated with suspicious behavior by considering the first collection of information 302 in combination with the second collection of information 304. Namely, as shown in FIG. 3, assume that the first collection information 302 identifies that network addresses X and Y are associated with suspicious behavior at two respective time frames. Assume that the item detection module 216 determines that, with reference to the second collection of information 304, user device A has used network address X within a time frame identified as suspicious by the first collection of information 302. Based on this finding, the item detection module 216 may conclude that is there is some likelihood that the user device A is infected with an undesirable item. Next assume that the item detection module 216 determines that, with reference to the second collection of information 304, user device A also has used network address Y within a time frame identified as suspicious by the first collection of information 302. Based on this finding, the item detection module 216 may conclude that there is even a greater likelihood that the use device is infected with an undesirable item.

The above scenario illustrates one example of the way in which the severity assessment module 218 can assign levels of confidence to the diagnoses made by the item management module 216. More generally, the severity assessment module 218 can rely on one or more factors in determining a level of confidence associated with suspicious behavior. According to one factor, the severity assessment module 218 can consider the reliability of a source or technique that indicates that a user device is infected with an undesirable item. In other words, the severity assessment module 218 can apply different weights to conclusions reached by different sources and techniques. According to another factor, the severity assessment module 218 can consider the extent of agreement in multiple findings that indicate that a user device is infected by an undesirable item. In other words, the severity assessment module 218 can apply more weight to findings that are shared by multiple sources and/or techniques. The severity assessment module 218 can rely on yet other factors and/or combinations of factors in identifying the level of threat posed by an undesirable item.

The item detection module 216 can also store information which indicates users who are using various user devices. For example, the item detection module 216 can store information which associates user IDs with respective user devices. A single user may operate a user device. Or plural users may regularly operate a single user device. User ID information can serve as an additional piece of evidence that helps link suspicious activity to a particular user device. For example, assume that it is determined that, in one instance of time, a network address and user ID are associated with suspicious activity. Next assume that, at another instance of time, another network address and the same user ID are associated with suspicious activity. Based on this evidence, there is some likelihood that the user is operating the same user device which is infected with an undesirable item (although it is also possible that the same user is operating two different user devices that are both infected with an undesirable item). As will be discussed below, the user ID information can also be leveraged in notifying a user of a possible infection and/or resolving the possible infection.

In the examples developed above, there is a one-to-one-correspondence between user devices and associated network addresses, although, as stated, this correspondence may not be static. In other instances, at any given time, plural user devices may be represented to the networks 210 using a single network address. This raises an additional level of ambiguity in tracing suspicious activity to a particular user device. Techniques are described below (in Section A.4) for addressing these types of scenarios.

A.3. Illustrative Remedy Module

Figure 4:
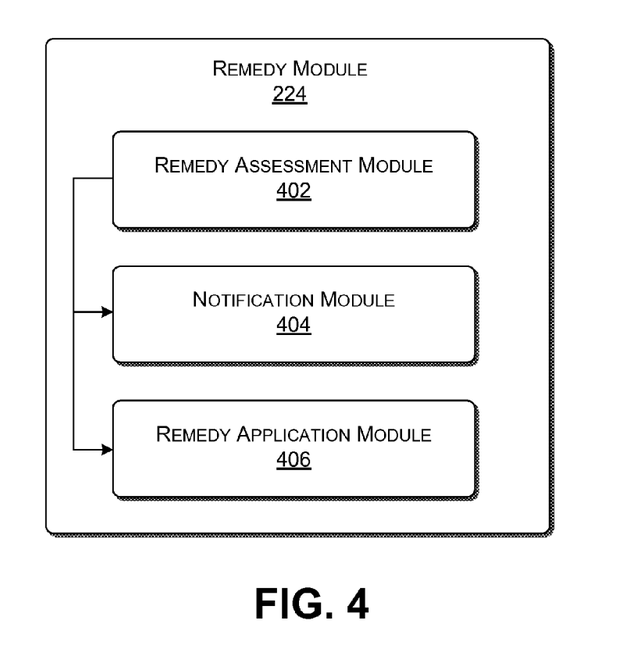
FIG. 4 shows details of a remedy module used in the system of FIG. 2.

FIG. 4 shows an illustrative composition of the remedy module 224 introduced in the context of FIG. 2. As stated above, the purpose of the remedy module 224 is to take remedial action in response to the detection that a user device may be infected with an undesirable item.

The remedy module 224 can include a number of components. A first component is a remedy assessment module 402. The remedy assessment module 402 determines how to respond to a threat identified by the item detection module 216 having a detected degree of confidence (as assessed by the severity assessment module 218). In one case, the remedy assessment module 402 identifies a plurality of different approaches that may be taken in response to assessed threats. Each approach can be tagged with metadata that describes the type of threat it is designed to address and/or the severity of threat that it is designed to address. In application, assume that the item detection module 216 determines that a threat of type M has been detected having a level of confidence of S. The remedy assessment module 402 can use these parameters to identify an appropriate approach that may be taken to address the threat.

The approach to a threat may have two or more components. A notification module 404 handles a notification-related component of the approach. Namely, the notification module 404 operates by notifying a user device that it has been potentially infected by an undesirable item. The notification module 404 may forward different notification messages for different types threats that have been detected and/or different levels of confidence associated with the threats.

Alternatively, or in addition, third party entities (such as a third party security provider, etc.) can generate notifications.

A remedy appliance module 406 handles an action-related component of the approach. Namely, the remedy appliance module 406 operates by taking one or more actions to address problems identified by threats. For example, in a first case, the remedy appliance module 406 automatically takes action to protect an undesirable item from causing harm to the user device (and to the general interests of the user), and/or to protect the undesirable item from causing damage to the data processing environment 200 at large, e.g., by further propagating itself within the data processing environment 200. For example, as will be described in greater detail below, the remedy appliance module 406 can take various steps to restrict the operation of the user device. In a second case, the notification module 404 can make various suggestions to the user to assist the user in removing or neutralizing the effect of the undesirable item. If the user opts to act on one or more of these suggestions, the remedy appliance module 406 can provides various services to help the user remove or otherwise neutralize the undesirable item.

In a particular case, the remedy module 224 can apply the notification module 404, but not the remedy application module 406. In a second case, the remedy module 224 can apply the remedy application module 406, but not the notification module 404. In a third case, the remedy module 224 can apply both the notification module 404 and the remedy application module 406. In any case, the notification module 404 can take a multi-leveled approach to sending notification messages that is independent of the multi-leveled approach taken by the remedy application module 406 in rectifying threats. Alternatively, the multi-leveled approaches taken by the notification module 404 and the remedy application module 406 can be linked together in various ways.

Figure 5:
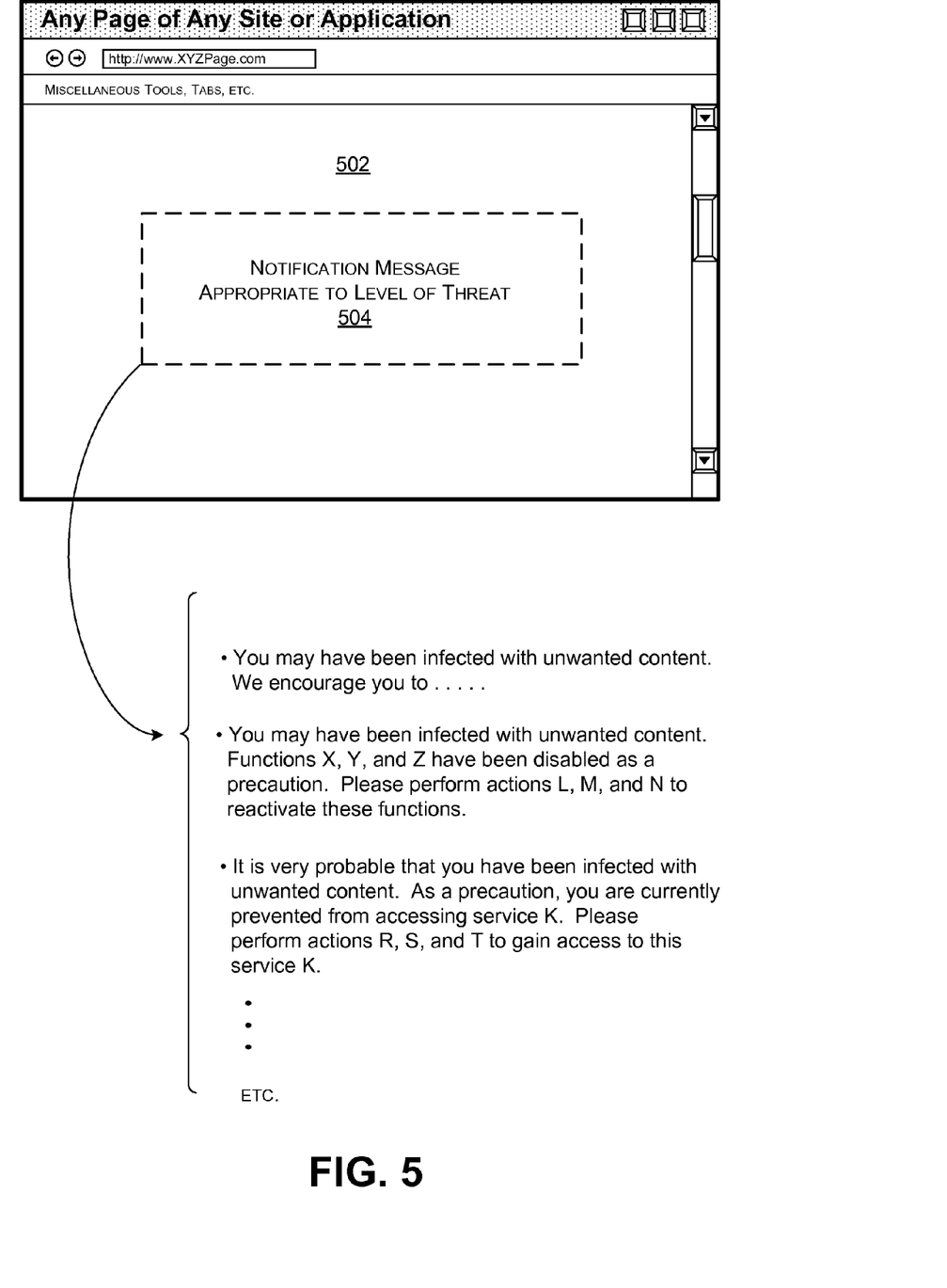
FIG. 5 shows a generic user interface presentation that can be presented by the remedy module of FIG. 4.

FIG. 5 shows a generic user interface page 502 through which the remedy module 224 can interact with the user. In this particular case, assume that the item detection module 216 has determined that there is a risk that the user device has been infected with an undesirable item. Next assume that user attempts to access a network-accessible service, such as by activating an address of the service and/or attempting to log into the service. At this juncture, the remedy module 224 can come into play by sending a notification message 504 to the user. The notification message 504 may inform the user of the nature of the threat to the user and the actions that have been (or can be) taken in response to the threat.

The remedy module 224 can present the notification message 504 in any manner. In one case, the remedy module 224 can represent the notification message 504 in its own dedicated page (e.g., with no other informational content). In another case, the remedy module 224 can present the notification message 504 in one or more pages that also include other informational content. For example, the remedy module 224 can allow the user to access a network-accessible service, but the module 224 displays a footer and/or header (etc.) which presents a warning message and/or various security-related instructions.

In one case, for instance, the notification message 504 informs the user that his or her device may have been infected. This type of message may encourage the user to taken various non-mandatory steps to address the threat posed by the undesirable item. In another case, the notification message 504 may inform the user that his or her device is likely infected by the undesirable item. This type of message may inform the user that action has already been taken to reduce the harm that may be caused by the undesirable item. The action taken may be to prevent the user device from using some (or all) of the functions of the network-accessible service. The message 504 may inform the user of various steps that may be taken if the user wishes to continue using the full functionality provided by the network-accessible service.

In one case, the remedy module 224 can send the notification message 504 to the user via the user device that is thought to be likely infected with the undesirable item. In another case, the remedy module 224 can send the notification message 504 to another device and/or to another user. For example, consider the scenario in which the item detection module 216 determines that a user device (such as a home PC) operated by the user is likely to be infected with an undesirable item. Instead of sending a notification message to that device, the remedy module 224 can send a notification message to another device operated by the user (such as the user's work PC). In another scenario, the remedy module 224 can send a notification message to another user affiliated with the user, such as the user's spouse, supervisor, etc. Users can be identified via respective user IDs in the manner described above.

A.4. Illustrative Intermediary Appliance Module

Figure 6:
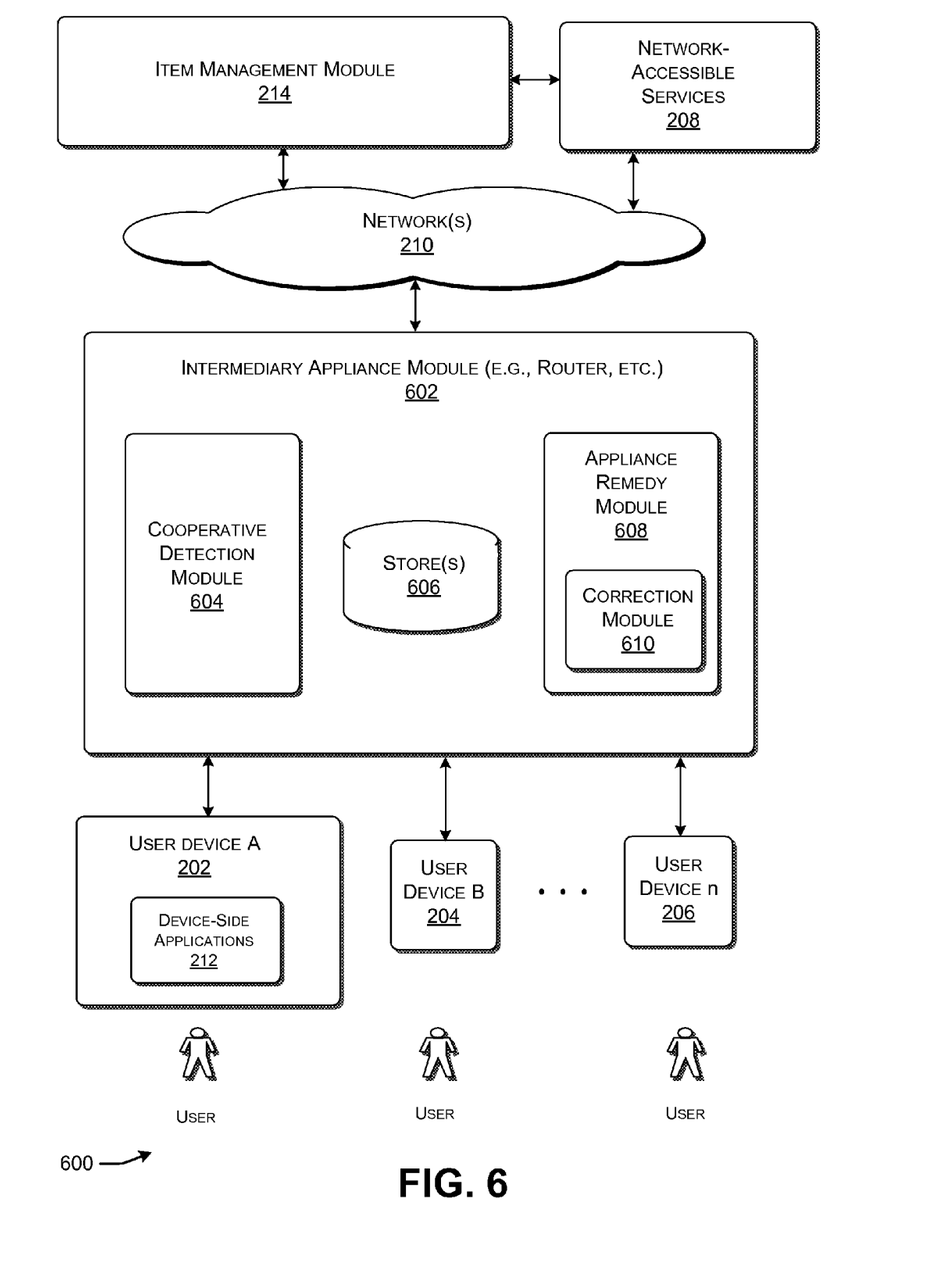
FIG. 6 shows a variation of the system of FIG. 2 that includes an intermediary appliance module.

FIG. 6 shows a data processing environment 600. The data processing environment 600 is a variation of the data processing environment 200 shown in FIG. 2. The environment 600 includes many of the same components as the environment 200, including a plurality of user devices (202, 204, . . . 206) that interact with network accessible services 208 via one or more networks 210. Each user device can include various applications; for example, user device A 202 includes one or more applications 212. An item management module 214 serves the role of detecting undesirable items that may infect the user devices (202, 204, . . . 206). The item management module 214 can also help the user devices (202, 204, . . . 206) address the risks posed by the undesirable items. Each of these components performs the same functions described above (unless otherwise noted below), and hence an explanation of these components is omitted at this juncture of the description.

The data processing environment 600 of FIG. 6 supplements the environment 200 shown in FIG. 2 by including an intermediary appliance module 602, also referred to more simply as an intermediary module or a proxy module. The intermediary appliance module 602 can serve an intermediary role in the interaction between the user devices (202, 204, . . . 206) and the network accessible services 208, and/or between the user devices (202, 204, . . . 206) and the item management module 214. FIG. 6 shows one intermediary appliance module 602 that serves one group of user devices (202, 204, . . . 206); however, more generally, different intermediary appliance modules (not shown) can serve different groups of user devices.

The intermediary applicant module 602 can be implemented in any manner. In one case, the intermediary module 602 corresponds to a discrete device that operates in a local environment associated with a group of user devices. In another case, the intermediary module 602 can correspond to a part of the networks 210. In another case, the intermediary appliance module 602 corresponds to a unit within any of the user devices (such as one or more supplemental processors associated with a motherboard of a user device). In another case, the intermediary module 602 can correspond to a virtual machine implemented by any module or combination of modules shown in FIG. 6.

In one illustrative case, the intermediary appliance module 602 can optionally be combined with other intermediary functionality that can be used by the data processing environment 600. For example, the intermediary appliance module 602 can be combined with a router, firewall, gateway, and/or other type of intermediary functionality. The intermediary functionality can couple a group of user devices to the network 210. For instance, the group of user devices shown in FIG. 6 may correspond to user devices used within a household, an organization, etc. The intermediary functionality may use a single network-facing address (e.g., a single IP address) to represent all of the user devices in the group to the network 210. When a message is received by the network 210, the intermediary functionality can direct the message to the appropriate user device(s) within the group of user devices. The intermediary functionality can also include Network Address Translation (NAT) functionality to translate source and destination addresses as appropriate.

The intermediary appliance module 602 can work in cooperation with the item management module 214 to help identify user devices that may be infected with undesirable items. For example, the intermediary appliance module 602 can include a cooperative detection module 604. The cooperative detection module 604 can maintain records in a store 606 regarding communication between the user devices and various network-accessible entities. For example, the cooperative detection module 602 can identify that user device A connected to the network(s) 210 in time frame X, user device B connected to the network(s) 210 in time frame Y, and so on. The item management module 214 can work in parallel with the intermediary appliance module 602 by identifying network addresses (and associated time frames) that are associated with potential malicious activity. In one case, the cooperative detection module 604 can periodically forward its records to the item management module 214. The item management module 214 can then combine its information with the information forwarded by the cooperative detection module 604 to determine user devices that may be infected with undesirable items (e.g., in the manner set forth above with respect to FIG. 3). In another implementation, the item management module 214 can periodically forward its records to the cooperative detection module 604. The cooperative detection module 604 can then serve as the locus for determining user devices that may be infected with undesirable items (in the manner set forth in FIG. 3). In general, the item management module 214 may be aware that multiple user devices are possibly being represented by a single network address by virtue of information presented in communication messages (e.g., packet TTLs). The item management module 214 may leverage this information in attempting to pinpoint the user device that is responsible for malicious activity.

In one case, the intermediary appliance module 602 in cooperation with the item management module 214 can unambiguously identify user devices that are associated with malicious activity. That is, in these cases, there may be a one-to-one nexus that links user devices to malicious activity. In another case, the intermediary appliance module 602 and the item management module 214 may not be able to pinpoint the user devices that are associated with malicious activity, e.g., based on address and time frame information alone. In these circumstances, the intermediary appliance module 602 can rely on supplemental information to help disambiguate the user device(s) that may be infected by an undesirable item.

For example, assume that the item management module 214 identifies that a certain network address in an identified time frame is associated with potential Email spam activity. The intermediary appliance module 602 may determine that multiple user devices were interacting with the network(s) 210 during that time frame, all using the same network address. Based on this information alone, the intermediary appliance module 602 may be unable to identify the user device that may be infected with the undesirable item. The intermediary appliance module 602 can help narrow down the source of the problem by determining which user devices specifically were engaging in Email activity within the identified time frame. The intermediary appliance module 602 can make this determination by querying the item management module 214, and/or the network-accessible services 208, and/or its own local store(s) 606.

The intermediary appliance module 602 includes an appliance remedy module 608 that may work in conjunction with the remedy module 224 of the item management module 214. The appliance remedy module 608 operates to serve notices to user devices that may be affected by an undesirable item. The appliance remedy module 608 may also operate to remove an undesirable item and/or otherwise mitigate the effects of the undesirable item.

For example, as to the notification role, assume the item management module 214, in possible conjunction with the intermediary appliance module 602, has determined that a particular user device may be infected by an undesirable item. When this user device attempts to log onto a network-accessible service, the data processing environment 600 can direct the user to the intermediary appliance module 602, which is acting a proxy for the requested network-accessible service. The intermediary appliance module 602 can then notify the user of the potential threat to security and what to do about it.

In another case, the appliance remedy module 608 can send a notification to another user device within the group of user devices that is less likely to be infected by the undesirable item. The user that receives the notification can notify the user associated with the potentially infected device of the possible threat. This provision makes it less likely that the undesirable item can intercept or otherwise interfere with the notification messages sent by the appliance remedy module 608. For example, consider the case where the group of user devices corresponds to computers used within a single household. A parent may receive a notification that her daughter's computer has been possibly infected by an undesirable item. The parent can then take proactive steps to remove the undesirable item or otherwise mitigate its effects.

The appliance remedy module 608 can take other actions in response to assessed threats to one or more user devices. For example, upon determining that a user device is likely to be infected by an undesirable item, the application remedy module 608 in possible cooperation with the item management module 214 can effectively quarantine the infected user device, thereby preventing that user device from using certain network service functions or all network service functions.

The appliance remedy module 608 can also take an active role in removing undesirable items. In one case, the appliance remedy module 608 can include a correction module 610. The correction module 610 includes functionality that allows the intermediary appliance module 602 to detect and remove undesirable items from a user device. In application, a user may physically couple a user device to the intermediary appliance module 602, e.g., by a Universal Serial Bus (USB) interface or some other coupling mechanism. The correction module 610 can then go to work by scanning the memory of the user device for undesirable items and potentially removing the items. If the undesirable items cannot be addressed in this manner, the appliance remedy module 608 can provide tools (or can reference tools) that allow the user to reformat or reboot the infected machine.

To remain up to date with respect to current threats, the correction module 610 can receive periodic updates from the item management module 214. The updates may provide signatures associated with newly detected security threats.

The correction module 610 can also include various provisions to help secure it from attack by malicious entities. For example, the correction module 610 can include a special log-in procedure that restricts access to the correction module 610 to authorized entities. The correction module 610 can also preclude users from installing other applications on the correction module 610.

Finally, the intermediary appliance module 602 can also collect diagnostic data regarding attacks that are made on the intermediary appliance module 602 or other suspicious behavior that it observes. It can then forward this diagnostic data to the item management module 214 to help it identify undesirable items and associated malicious entities. For example, the intermediary appliance module 602 can present itself to the data processing environment 600 as a user device with known vulnerabilities. The intermediary appliance module 602 can record any entity that interacts with it in a suspicious manner and report such interaction to the item management module 214. Any user device can also perform the above-described diagnostic logging and reporting functions.

A. 5. Illustrative Processing Functionality

Figure 7:
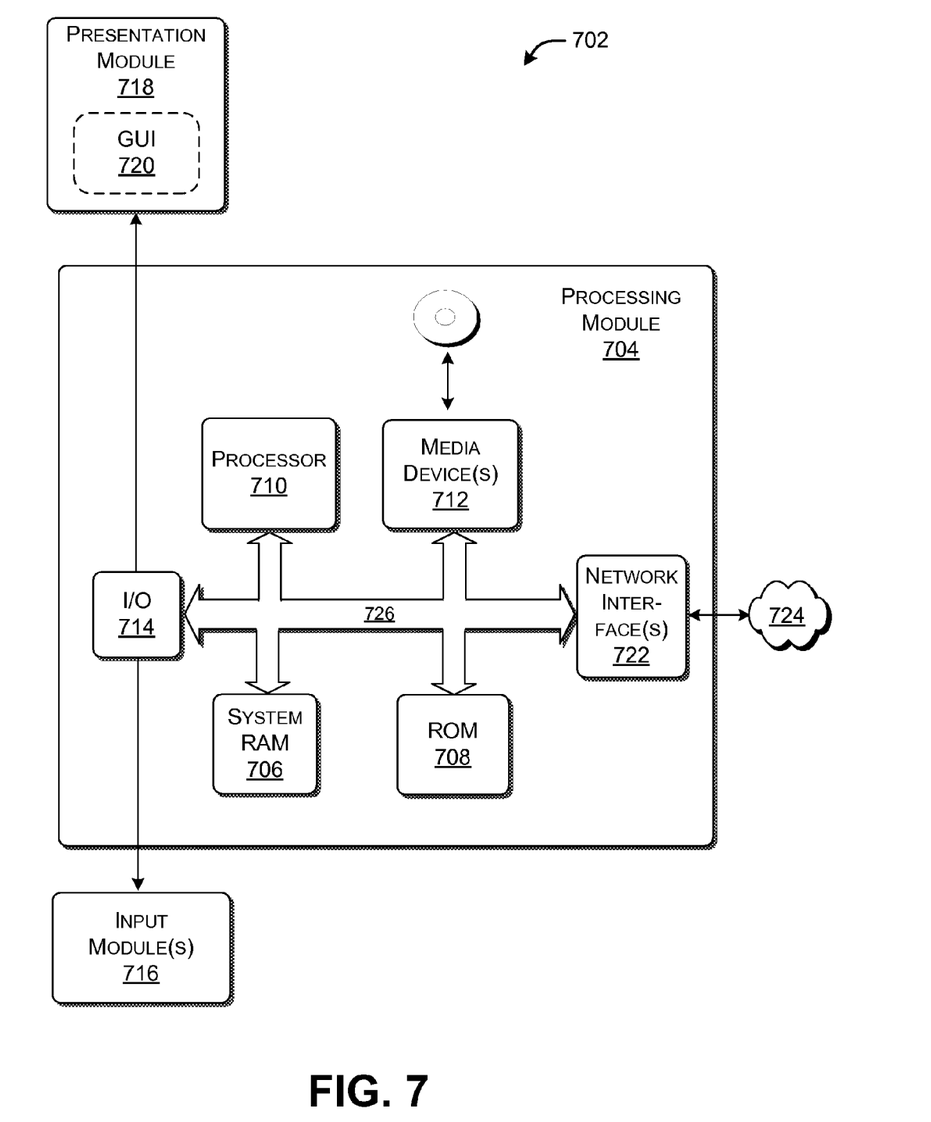
FIG. 7 shows illustrative processing functionality that can be used to implement any aspect of the system of FIG. 2.

FIG. 7 sets forth illustrative processing functionality 702 that can be used to implement any aspect of system 200 shown in FIG. 2 or the system 600 shown in FIG. 6. In one non-limiting case, for instance, the processing functionality 702 may represent any computer machine used by the systems (200, 600), e.g., to implement any aspect of the item management module 214, any aspect of the network-accessible services 208, any aspect of the user devices (202, 204, . . . 206), any aspect of the intermediary appliance module 602, and so on.

The processing functionality 702 can include a processing module 704 for implementing various processing functions. The processing module 704 can include volatile and non-volatile memory, such as RAM 706 and ROM 708, as well as one or more processors 710. The processing functionality 702 can perform various operations identified above when the processor(s) 710 execute instructions that are maintained by memory (e.g., 706, 708, or elsewhere). The processing functionality 702 also optionally includes various media devices 712, such as a hard disk module, an optical disk module, and so forth.

The processing functionality 702 also includes an input/output module 714 for receiving various inputs from the user (via input module 716), and for providing various outputs to the user (via presentation module 718). The presentation module 718 can provide a graphical user interface (GUI) 720. The processing functionality 702 can also include one or more network interfaces 722 for exchanging data with other devices and systems via one or more communication conduits 724. One or more communication buses 726 communicatively couple the above-described components together.

B. Illustrative Procedures

Figure 8:
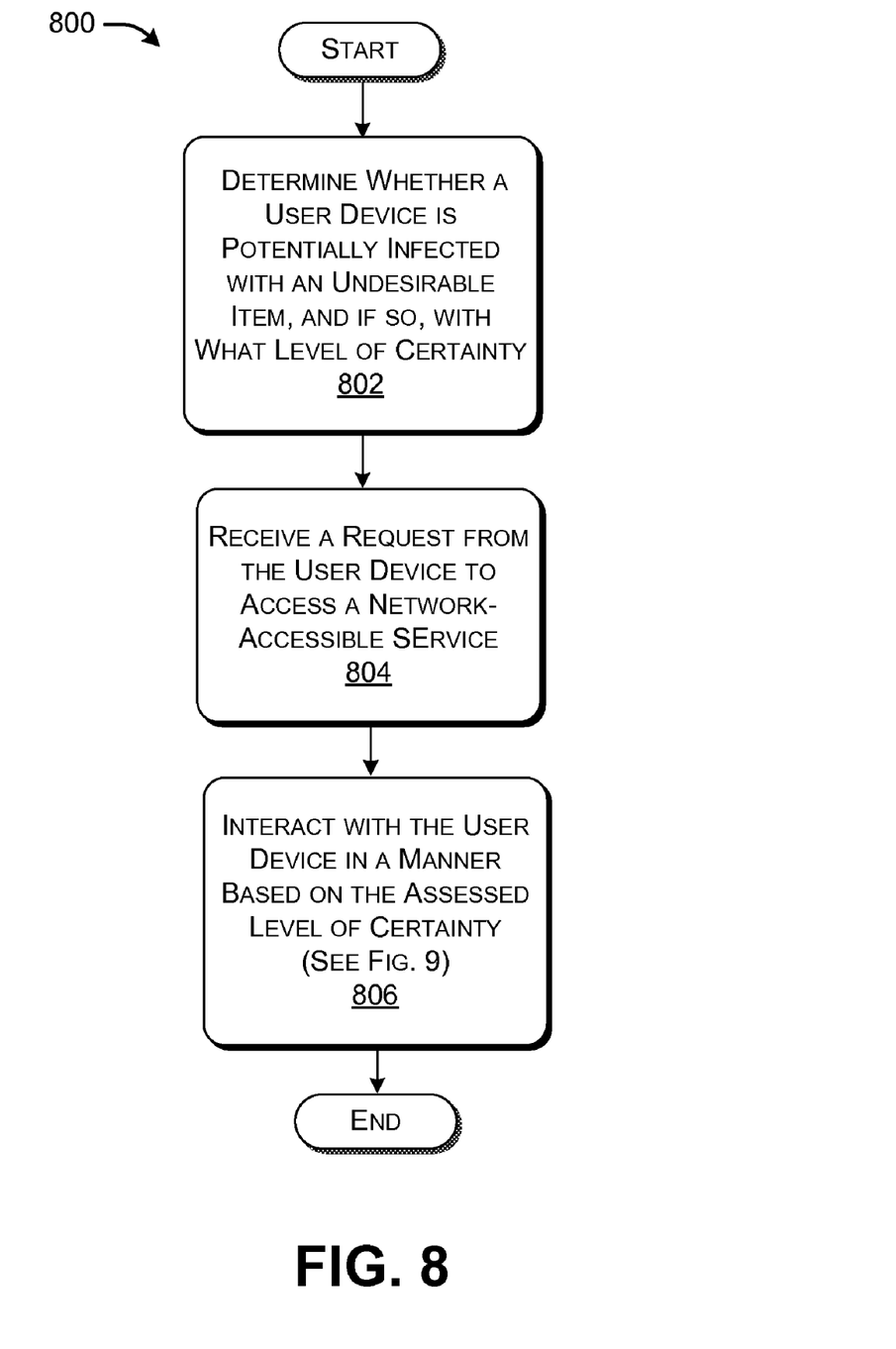
FIG. 8 is a flowchart that presents an overview of one manner of operation of the system shown in FIG. 2.
Figure 9:
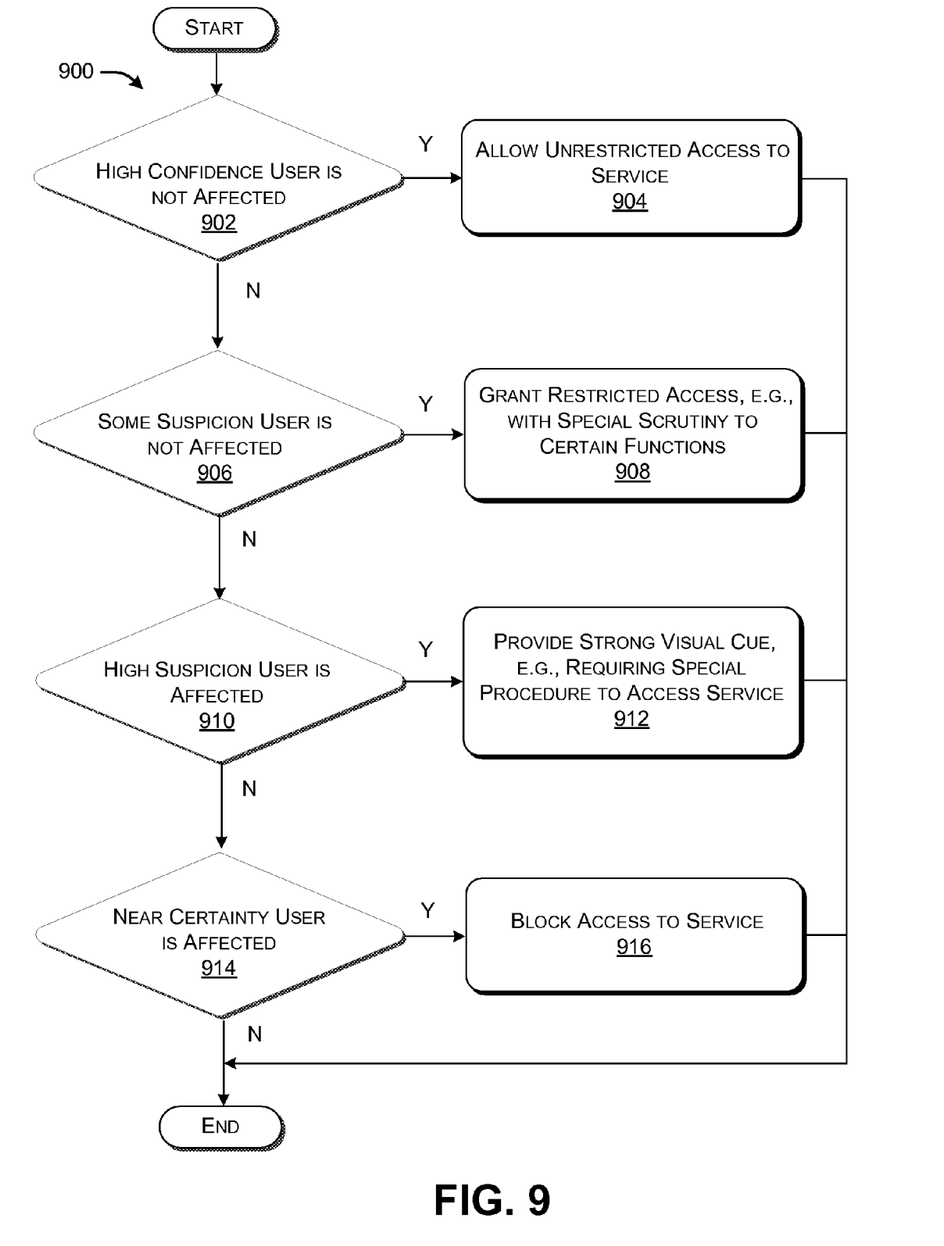
FIG. 9 is a flowchart which sets forth additional detail regarding the operation of the system shown in FIG. 2.

FIGS. 8 and 9 describe the operation of the systems (200, 600) in flow chart form. Namely, FIG. 8 shows a procedure 800 that sets forth an overview of the operations of the systems (200, 600). FIG. 9 shows a procedure 900 that provides further details regarding the manner in which the item management module 214 interacts with the user devices (202, 204, . . . 206) for different types and levels of threats posed by undesirable items. Although the operations are described as being performed by the item management module 214 alone, the intermediary appliance module 602 (of FIG. 6) can perform a cooperative role in performing the operations.

Starting with FIG. 8, in block 802, the item management module 214 determines whether a user device is potentially infected with an undesirable item. The item management module 214 can also quantify the level of confidence associated with the potential infection. For example, the severity assessment module 218 can determine that: a) there is a high confidence that the user device is not infected; b) there is some suspicion that the user device is infected; c) there is high suspicion that that the user device is infected; or d) it is virtually certain that the user device infected. Level (b) is higher than level (a), level (c) is higher than level (b), and level (d) is higher than level (c). The breakdown of certainty levels into four levels is merely illustrative; in other cases, the item management module 216 can identify more than (or less than) four levels of certainty. Any of the tools described in Section A can be used to determine the type and level of threat posed by a potential infection.

In block 804, the item management module 214 can receive a request from the user device to access a network-accessible service. This operation may correspond to a user's attempt to access a network address associated with the network-accessible service, and/or a user's attempt to log onto the network-accessible service, etc.

In block 806, the item management module 214 can interact with the user device in a manner that is based on the assessed level of certainty that the user has been infected (as determined in operation 802). The manner of interaction can also be based on the type of threat posed by the potential infection. There are at least two aspects of this interaction. As a first aspect, the item detection module 216 provides a notification message to the user device that informs the user device that it is infected. The nature of this notification message can be based on the level of confidence associated with the detected threat. As a second aspect, the item detection module 216 can perform actions to reduce the harm caused by the undesirable item and/or to help the user device remove the undesirable item or otherwise neutralize its harmful effects. Again, the nature of these actions can be based on the level of confidence associated with the detected threat.

FIG. 9 is a flowchart which expands on the manner in which the item management module 214 interacts with a user device that may be infected with an undesirable item. FIG. 9 is to be understood as merely one illustration of a multi-leveled approach to addressing security risks; other implementations can address security risks in different ways. For instance, the flowchart shows different levels of interaction that may be appropriate for different levels threat. Although this flowchart identifies four levels, other implementations can include fewer than (or more than) four levels.

In block 902, the item management module 214 determines that there is a high level of confidence that the user device is not infected. In response, in block 904, the item management module 214 can grant unrestricted access to the network-accessible service.

In block 906, the item management 214 module determines that there is some suspicion that the user device is infected by the undesirable item, although there is not a high level of confidence associated with this prognosis. In response, in block 908, the item management module 214 can grant restricted access to the network-accessible service. For example, the item management module 214 can provide unrestricted access to some functions, but may place restrictions on other functions that pose a greater risk. For example, the item management module 214 can restrict operations such as file transfers and/or purchase-related transactions. The purpose of restricting file transfers is to stem the propagation of the undesirable item throughout the data processing environment. The purpose of restricting monetary transactions is to prevent a malicious entity from invoking the undesirable item to steal the user's credentials and/or funds, and so forth. The group of functions that the item management module 214 may choose to restrict may depend on the type of threat posed by the suspected undesirable item. For example, in certain cases, it may be apparent that the undesirable item is designed to mount a "phishing" type of attack by impersonating a bank website that the user frequently visits. In this case, the item management module 214 can place special restriction on any functions in which a user may supply account information to a network-accessible service.

Still referring to block 908, the item management module 214 can restrict operation of certain functions in various ways. First, the item management module 214 can provide an appropriate notification message which informs the user as to what functions are being restricted, why these functions are being restricted, and how the user may overcome these restrictions. In one case, the item management module 214 may restrict the functions by preventing the user device from accessing these functions. The item management module 214 can allow the user to resolve these restrictions through various mechanisms. In a first case, the item management module 214 can require the user to undergo a special security procedure to access the functions. For example, the item management module 214 can ask the user to respond to a Human Interactive Proof (HIP) presentation (or the module 214 can ask the user to respond to more HIP presentations than is normally the case), interact with a human representative in a call center, and so forth; these operations will help ensure that the user is expressly authorizing certain actions, as opposed to an automated program that is masquerading as the user. In a second case, the item management module 214 may require the user to perform certain corrective actions to help remove the undesirable item, such as by running a clean-up utility program, contacting a human representative, and so on.

In block 910, the item management 214 module determines that there is high suspicion that the user device is infected by the undesirable items. In response, in block 912, the item management module 214 can provide a strong visual cue which informs the user of the potential problem. The item management module 214 can also optionally disable the entire service or at least the most vulnerable parts of the service. The item management module 214 can require the user to perform any one or more of the corrective actions described above to re-enable the full functionality of the service.

In block 914, the item management 214 module determines that it is virtually certain that the user device is infected by the undesirable items. In response, in block 912, the item management module 214 can provide a strong visual cue which informs the user of the potential problem and may automatically disable the entire service or at least the most vulnerable parts of the service. The item management module 214 can require the user to perform any one or more of the corrective actions described above to re-enable the full functionality of the service. The corrective actions performed in block 916 may be made more mandatory and/or thoroughgoing compared to the corrective actions performed in block 912.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method for addressing a threat to the security of a user device that utilizes a network-accessible service, comprising:
assessing a likelihood that the user device is infected by an undesirable item, the assessing comprising:
detecting a potential presence of the undesirable item within a particular time frame, the presence being associated with activities for an identified network address; and
determining whether the user device utilized the identified network address within the particular time frame;
receiving a request by the user device to access the network-accessible service; and
in response to the request, interacting with the user device in a manner that is governed by the assessed likelihood that the user device is infected by the undesirable item, wherein the user device is operated by at least one user, wherein the interacting with the user device comprises sending a notification message to another device operated by the at least one user to notify the at least one user of the assessed likelihood of the user device being infected by the undesirable item.

2. The method of claim 1, wherein the undesirable item is instruction-bearing content that can be commandeered to perform an action that is undesirable from the standpoint of a user.

3. The method of claim 1, wherein the interacting with the user device comprises, for an identified level of likelihood that the user device is infected with the undesirable item, granting the user device unrestricted access to the network-accessible service.

4. The method of claim 1, wherein the interacting with the user device comprises, for an identified level of likelihood that the user device is infected with the undesirable item, granting the user device restricted access to the network-accessible service.

5. The method of claim 1, wherein the interacting with the user device comprises, for an identified likelihood that the user device is infected with the undesirable item, providing a security warning to the user device, wherein the security warning can be provided with or without a restriction of access to the network-accessible service.

6. The method of claim 1, wherein the interacting with the user device comprises, for an identified level of likelihood that the user device is infected with the undesirable item, granting the user device access to the network-accessible service in response to said at least one user performing a security-related procedure that cannot be readily duplicated by the undesirable item.

7. The method of claim 1, wherein the interacting with the user device comprises, for an identified level of likelihood that the user device is infected with the undesirable item, preventing the user device from accessing the entire network-accessible service.

8. The method of claim 1, wherein said at least one user includes another user who operates the user device, wherein the interacting with the user device comprises sending a notification message to the another user, via another user device, who operates the user device to notify the another user of the likelihood of the user device including the undesirable item.

9. The method of claim 1, wherein the user device interacts with the network-accessible service via an intermediary module.

10. The method of claim 9, wherein the intermediary module, in cooperation with an item management module, plays a role in the assessment of the likelihood that the user device is infected by the undesirable item.

11. The method of claim 10, wherein the assessment of the likelihood comprises:
identifying, by the item management module, that a network address within a particular time frame is associated with a potential presence of the undesirable item; and
determining, based on information provided by the intermediary module, that the user device is associated with the network address within the particular time frame.

12. The method of claim 11, wherein the user device is one of a plurality of user devices that interact with the network-accessible service via the intermediary module, wherein the determining ascertains, based on information provided by the intermediary module, that there is a likelihood that the user device is infected with the undesirable item.

13. The method of claim 9, wherein the intermediary module plays a role in the interaction with the user device following the assessment.

14. The method of claim 13, wherein the intermediary module serves as a proxy in notifying the user device that there is a likelihood that the user device is infected with the undesirable item.

15. The method of claim 13, wherein the user device is one of a plurality of user devices that interact with the network-accessible service via the intermediary module, and wherein the intermediary module sends a notification that there is a likelihood that the user device is infected with the undesirable item to one of the plurality of user devices that is not likely to be infected by the undesirable item.

16. An item management module for addressing a threat to the security of a user device that utilizes network-accessible service, comprising:
an item detection module configured to make an assessment of a likelihood that the user device is infected by an undesirable item, the assessment comprising:
examining an interaction of the user device with at least one network accessible entity;
determining if a plurality of user devices that use the network-accessible service are sending a large number of Email messages in unison;
determining if the user device is rapidly making click selections;
determining if the user device is making a large number of requests to ports that are associated with well known exploits; and
a remedy module configured to:
receive a request by the user device to access the network-accessible service; and
in response to the request, interact with the user device in a manner that is governed by the assessed likelihood that the user device is infected by the undesirable item.

17. The item management module of claim 16, wherein the undesirable item is instruction-bearing content that can be commandeered to perform an action that is undesirable from the standpoint of the user.

18. The item management module of claim 16, further comprising a store that maintains information regarding at least one network address associated with the potential presence of the undesirable item in conjunction with at least one time frame associated with the potential presence, wherein the item detection module is configured to use the information in making its assessment.

19. An intermediary appliance module for interfacing between a user device and a network-accessible service, comprising:
a cooperative detection module configured to cooperate with an item management module to make an assessment of a likelihood that the user device is infected by an undesirable item, the assessment comprising:
detecting a potential presence of the undesirable item within a particular time frame, the presence being associated with activities for an identified network address; and
determining whether the user device utilized the identified network address within the particular time frame; and
a remedy module configured to cooperate with the item management module to interact with the user device in a manner that is governed by the assessed likelihood that the user device is infected by the undesirable item.

* * * * *